(12) United States Patent
Okada (10) Patent No.: US 6,364,586 B1
(45) Date of Patent: Apr. 2, 2002

(54) MULTIPLE LOCKING POSITION CLIP WITH GROMMET AND PIN

(75) Inventor: Shigeo Okada, Kanagawa (JP)

(73) Assignee: Piolax Inc., Yokohama (JP)

( * ) Notice: Subject to any disclaimer, the term of this patent is extended or adjusted under 35 U.S.C. 154(b) by 0 days.

(21) Appl. No.: 09/652,663

(22) Filed: Aug. 31, 2000

(30) Foreign Application Priority Data

Sep. 2, 1999 (JP) ............................................. 11-248772

(51) Int. Cl.[7] ................................................ F16B 13/04
(52) U.S. Cl. ........................................... 411/41; 411/48
(58) Field of Search .............................. 411/41, 45–48, 411/53, 57.1

(56) References Cited

U.S. PATENT DOCUMENTS

| | | | | |
|---|---|---|---|---|
| 4,085,651 A | * | 4/1978 | Koscik | 411/41 |
| 4,276,806 A | * | 7/1981 | Morel | 411/41 |
| 4,405,272 A | * | 9/1983 | Wollar | 411/41 |
| 4,488,843 A | * | 12/1984 | Achille | 411/41 |
| 5,632,581 A | * | 5/1997 | Hasada | 411/48 |
| 6,048,147 A | * | 4/2000 | Arisaka | 411/41 |

FOREIGN PATENT DOCUMENTS

JP           61-53562        11/1986

* cited by examiner

*Primary Examiner*—Flemming Saether
(74) *Attorney, Agent, or Firm*—McGinn&Gibb, PLLC

(57) ABSTRACT

A clip 1 is provided with a grommet 4 and a pin member 6. The grommet 4 has an axial leg 3 formed in the shape of a hollow cylinder by a plurality of elastic pieces 2. The pin member 6 is provided with an axial portion 7, recess grooves 8 and dams 10. Temporarily stopping pieces 9 are provided for the above recess grooves 8. Further, the above dams 10, 10 are formed at the leading half portions of the above recess grooves which the above axial leg comes into elastic contact with. By inserting the above axial portion 7 into a hollow portion 5 formed in the axial leg 3, the above elastic pieces 2 are expanded and plural panels are coupled to one another. At the temporarily fixing time, the temporarily stopping pieces 9 fit in fitting receivers 12 of the base ends of slits each of which is formed between the adjacent elastic pieces 2, thereby to prevent the pin member 6 from dropping out of the grommet. Further, the rotation of the pin member 6 is prevented by the dams 10.

12 Claims, 7 Drawing Sheets

PRIOR ART

FIG. 9

MULTIPLE LOCKING POSITION CLIP WITH GROMMET AND PIN

BACKGROUND OF THE INVENTION

1. Field of the Invention

The present invention relates to improvement of a clip used, for example, when a mold ceiling constituting a ceiling part of an automobile is coupled to a ceiling reinforcement and a front head panel, or when plural panels are coupled to one another.

2. Description of the Related Art

For example, a ceiling surface constituting the interior of the automobile is so composed that the mold ceiling made of synthetic resin is attached onto the lower surface side (interior side) of the ceiling reinforcement coupled to the front head panel in a state where the ceiling reinforcement is superimposed on the front head panel. In case that the above mold ceiling, the ceiling reinforcement and the front head panel are coupled to one another, in order to simplify an assembling operation, a clip 21 shown in FIG. 9 has been recently used instead of a bolt member and an adhesive.

The above clip 21 includes a grommet 24 having an-axial leg 23 formed in the shape of a hollow cylinder by a plurality of elastic pieces 22, 22 (three in the figure), and a pin member 26 that expands the above plural elastic pieces 22, 22 by being inserted into a hollow portion formed in the above axial leg 23. Further, flanges 27 and 28 are provided respectively for the above grommet 24 and the pin member 26. In case of the shown structure, a recess portion 29 into which the flange 28 of the above pin member 26 can be fitted is formed on the outer surface (upper surface in FIG. 9) of the flange 27 of the above grommet 24. Accordingly, in a state where the above pin member 26 is completely pushed into the grommet 24 (in a real fixing state), the flange 28 of the above pin member 26 is fitted into the above recess portion 29 so that the above flange 28 does not protrude very much from the flange 27 of the grommet 24.

In order to couple the above mold ceiling 18, the ceiling reinforcement 17 and the front head panel (not shown) to one another, firstly, the above grommet 24 is inserted into holes 30, 31 provided in positions where the mold ceiling 18, the ceiling reinforcement 17, and the front head panel to be coupled to one another are matched to one another, from one surface side (from interior side, and from upper side in FIG. 9) of the above mold ceiling 18. Then, the above pin member 26 is inserted into the hollow portion 25 of the grommet 24. Accompanied with this insertion of the pin member 26, the elastic pieces 22, 22 of the above grommet 21 are expanded on the other surface side (exterior side) of the above ceiling reinforcement 17 (front head panel), and the mold ceiling 18, the ceiling reinforcement 17 and the front head panel can be coupled to one another in a superimposed state on one another.

Figure 9:
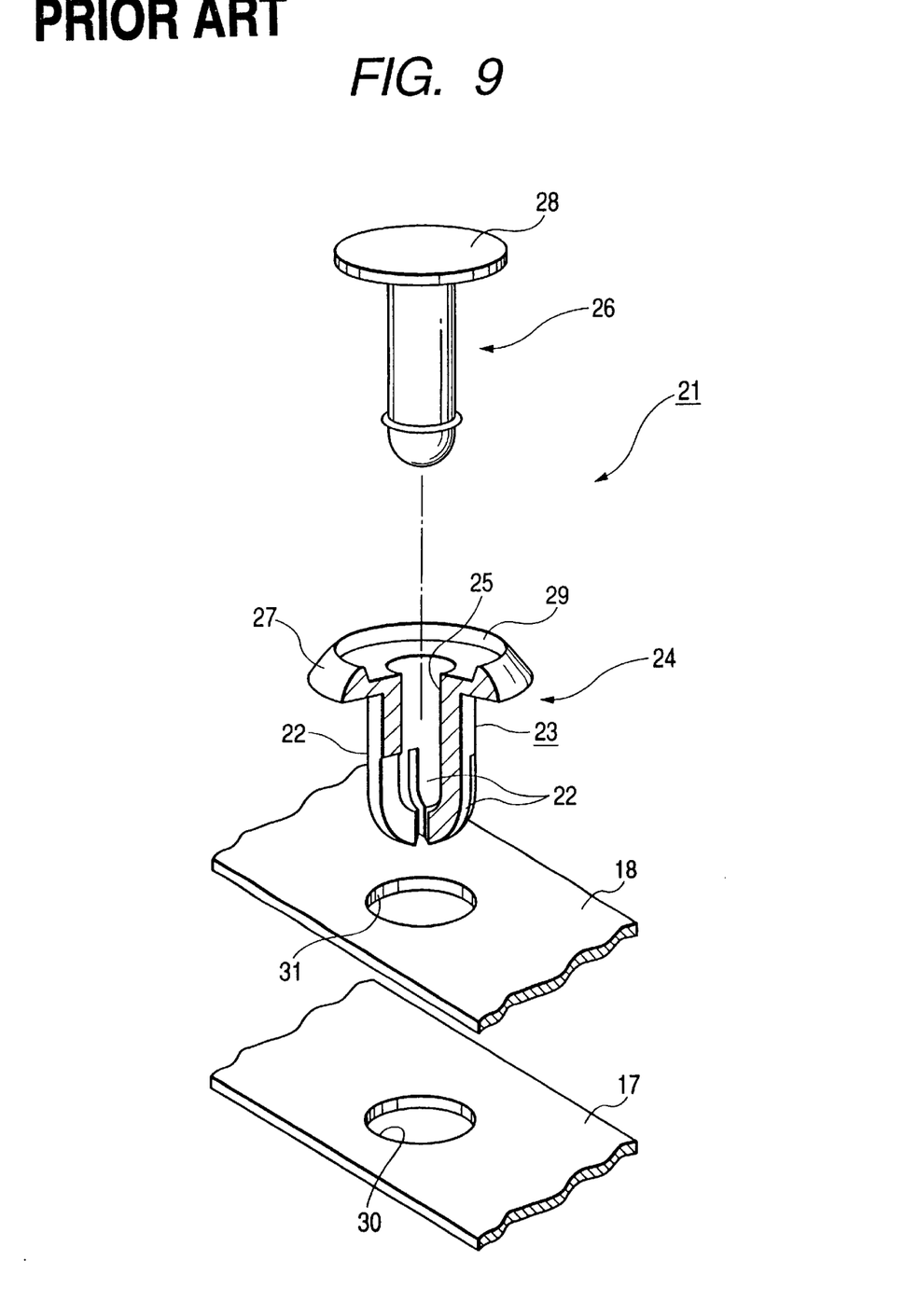
FIG. 9 is a partially vertical sectional perspective view, showing an example of a conventional structure.

Further, in order to smooth the assembling process, so-called modularization has been recently promoted. For example, the above ceiling reinforcement 17 and the mold ceiling 18 are previously fixed to each other temporarily, and thereafter, they are really fixed to the above front head panel in an automobile assembling factory. In case that this assembling method is adopted, the assembling operation is readily performed using the above clip 21. Namely, the above ceiling reinforcement 17 and the mold ceiling 18 are temporarily fixed by the above clip 21. In this case, the above pin member 26 is not completely inserted into the grommet 24 but is stopped in a half position. Hereby, the elastic pieces 22, 22 of the above grommet 24 are expanded to some degree, and the above ceiling reinforcement 17 and the mold ceiling 18 are a little coupled to each other. The ceiling reinforcement 17 and the mold ceiling 18 are carried in the assembling factory in this state, and they are coupled to the above front head panel. At this time, the above pin member 26 is only inserted into the grommet 24 completely, so that the assembling operation is simplified, the manufacturing time is reduced, and the manufacturing cost is reduced.

However, in the above-described conventional clip 21, the following disadvantages exist. Namely, in case that the pin member 26 constituting the above clip 21 was inserted into the grommet 24 in order to be temporarily fixed to the grommet 24, it was easy to drop out of this grommet 24. Therefore, in case that the panels (the above ceiling reinforcement 17, mold ceiling 18, and the like) that have been temporarily fixed using this clip 21 are transported, there is fear that the pin member 26 drops out on the way of transportation and the temporarily fixing state cannot be maintained. Further, even if the temporarily fixing state is maintained, since the pin member 26 drops out, the real fixing cannot be performed, so that the trouble is produced in the assembling process.

In order to solve the above-described disadvantages, a clip has-been disclosed in JP-B-61-053562, which includes a female member that corresponds to the above grommet and includes a slit, a male member that corresponds to the above pin member, and a temporarily stopping piece that is provided for this male member and fitted in a base end of the above slit. In case of the clip disclosed in JP-B-61-053562, the above temporarily stopping piece is fitted in the base end of the slit by inserting the above male member into the female member, whereby the male member and the female member are prevented from separating from each other. Accordingly, such the disadvantages are solved that the pin member 26 drops out on the way of the transportation like the conventional clip 21 shown in FIG. 9 and that the temporarily fixing state cannot be maintained.

However, in case of the aforesaid clip disclosed in JP-B-61-053562, when the male member is inserted into the female member, the temporarily stopping piece formed in the male member does not always enter into the slit formed in the female member. In case that the above temporarily stopping pieces does not enter into the slit, after the above male member is forcedly inserted into the female member, the above temporarily stopping piece must be caused to coincide with the slit forming position by rotating this male member properly to fit the temporarily stopping piece-in the slit base end. Therefore, the work performance was very unsatisfactory. Further, when the panels (the above ceiling reinforcement 17, mold ceiling 18 and the like) are temporarily fixed, in case that the temporarily stopping piece formed in the male member is not entering into the slit formed in the female member, there is fear that the male member drops out of the female member easily.

SUMMARY OF THE INVENTION

The invention has been made in view of the aforesaid circumstances and therefore an object of the invention is to provide the clip which prevents the pin member from dropping out without the complicated structure and which is satisfactory for the attaching work performance.

According to a first aspect of the invention, in the clip provided with a grommet having an axial leg formed in the shape of a hollow cylinder by a plurality of elastic pieces, and a pin member that expands the above plural elastic pieces by being inserted into a hollow portion formed in the above axial leg, the above pin member includes an axial portion that can be inserted into the above hollow portion, and a temporarily stopping piece that is provided for this axial portion and protrudes outward; the above grommet includes a recess portion which is formed on the inner surface of the above axial leg so as to extend from the top portion of the grommet to a slit formed between the adjacent elastic pieces; and the base end portion of the above slit serves as a fitting receiver in which the above temporarily stopping piece is fitted.

In the thus constructed clip according to the first aspect of the invention, in case that the pin member is inserted into the grommet in the temporarily fixing state, while the temporarily stopping piece provided for the axial portion of the pin member is being guided in the recess portion provided for the above grommet, the axial portion of this pin member is inserted into the hollow portion of the grommet. Thereafter, the above temporarily stopping piece is fitted in the fit receiver provided for the grommet. Therefore, the work of inserting the pin member into the grommet is easily performed, and the pin member is effectively prevented from dropping out of the grommet in the temporarily fixing state after the complete insertion.

Further, the clip according to a second aspect of the invention is characterized in that the above pin member includes a dam formed at a portion with which the above axial leg comes into elastic contact at the real fixing time.

In the thus constructed clip according to the second aspect of the invention, in case that the pin member is inserted into the grommet in the real fixing state, due to the existence of the above dam, the elastic piece provided for the grommet is effectively prevented from shifting and moving. Further, such an effect can be also expected that the above pin member is difficult to rotate in relation to the grommet due to the existence of this dam. Therefore, the grommet and the pin are prevented from shifting and moving, and the stable fixing state can be maintained also after the real fixing.

Further, the clip according to a third aspect of the invention is characterized in that a first flange is formed at the base end of the axial leg of the grommet and a second flange of which the diameter is larger than that of the above first flange is formed at the base end of the axial portion of the pin member and that a surface on the axial portion side of the above second flange is a recess surface into which the above first flange can be fitted. In case of this constitution, the projecting amount of the flange from the wall surface of the panel is reduced and a look is better. Further, the user is prevented from hitching his finger on the projecting flange and being injured, so that safety is improved.

Further, the clip according to a fourth aspect of the invention is characterized in that a tapered portion is provided for the base end of the hollow portion of the grommet and that the inclination of the leading end portion of the above temporarily stopping piece is steeper than the inclination of the above tapered portion. By adopting this constitution, the insertion of the axial portion into the above hollow portion is readily performed.

Further, the clip according to a fifth aspect of the invention is characterized in that the above recess portion continues from the middle of the above tapered portion. By adopting this constitution, the above temporarily stopping pieces is readily guided to the above recess portion.

BRIEF DESCRIPTION OF THE DRAWINGS

FIGS. 2A and 2B show a pin member in this embodiment, in which

FIGS. 3A to 3E show a grommet in this embodiment, in which FIG. 3E is a diagram viewed from the direction of an arrow a;

FIGS. 4A and 4B show a state where the pin member is about to be inserted into the grommet in order to be temporarily fixed, in which

FIGS. 5A and 5B show a state where the pin member is about to be inserted into the grommet in order to be really fixed, in which

DETAILED DESCRIPTION OF THE PREFERRED EMBODIMENTS

Next, one embodiment for carrying out the invention will be described in detail with reference to drawings.

Figure 1:
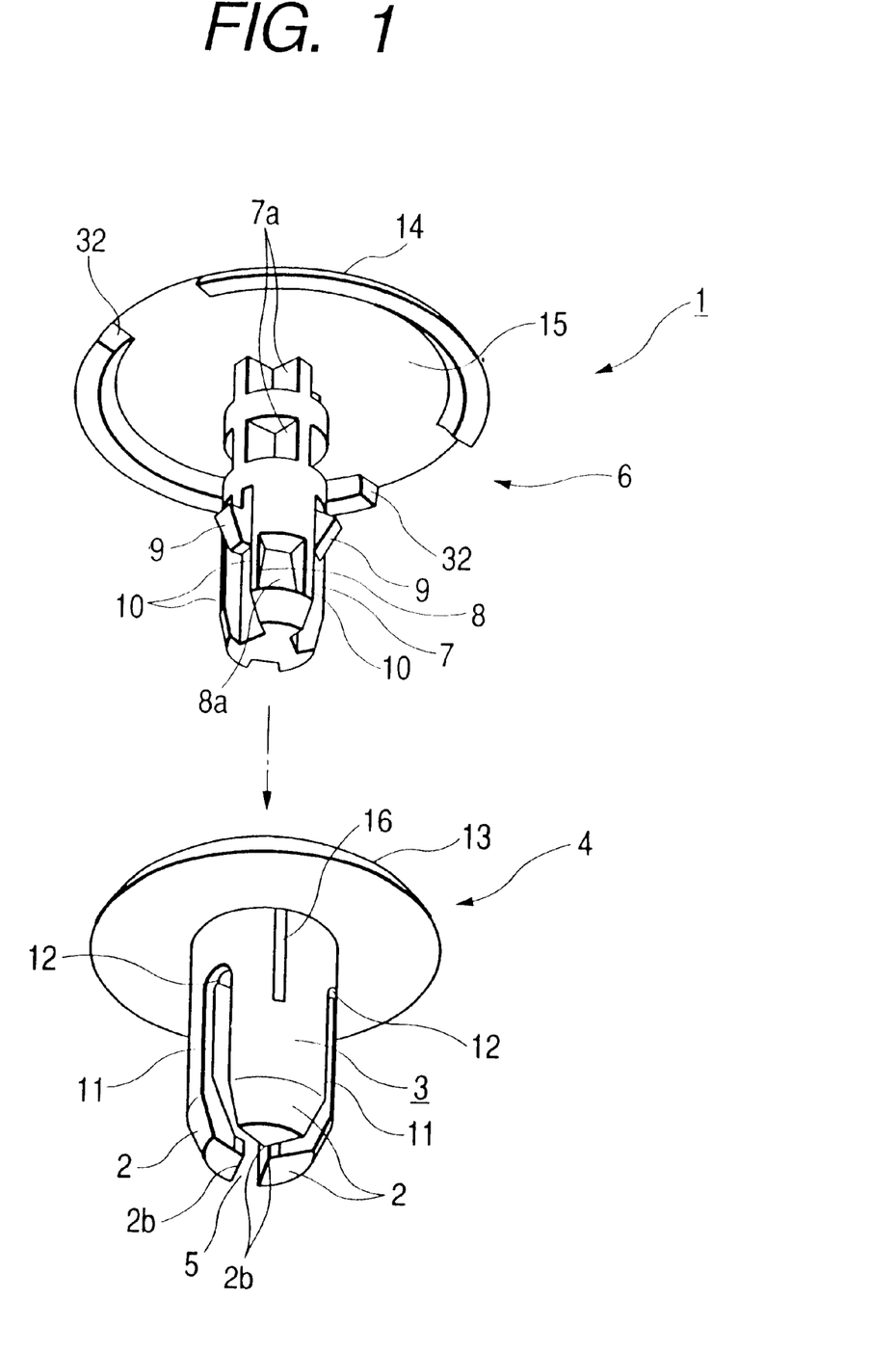
FIG. 1 is an exploded perspective view showing one embodiment for carrying out the invention.
Figure 7:
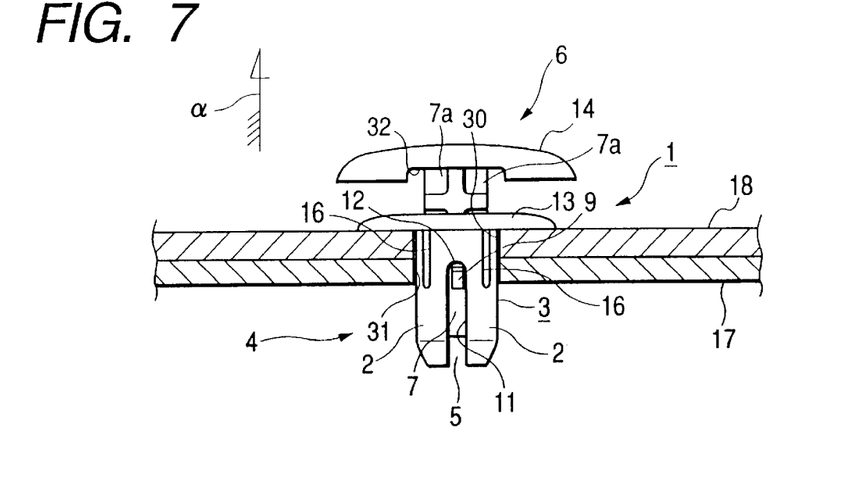
FIG. 7 front view showing the temporarily fixing. state.
Figure 8:
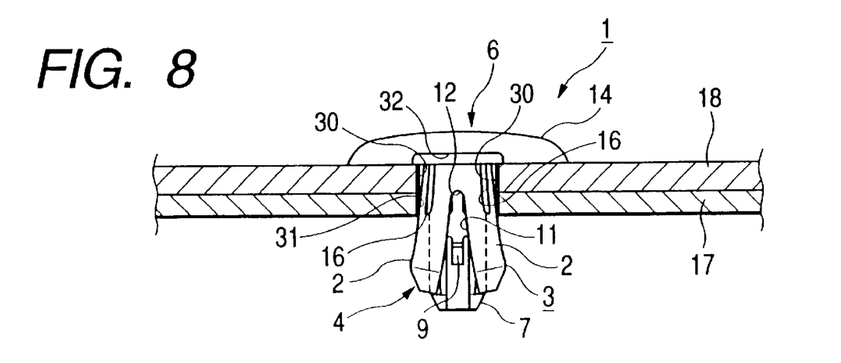
FIG. 8 is a front view showing the real fixing state.

The clip according to this embodiment includes, as shown in FIGS. 1 and 3, a grommet 4 having an axial leg 3 formed in the shape of a hollow cylinder by a plurality of elastic pieces 2 (three elastic pieces in this embodiment), and a pin member 6 that expands the above plural elastic pieces 2 by being inserted into a hollow portion 5 formed in the above axial leg. And, the above grommet 4 is inserted into holes 30, 31 provided in positions where a ceiling reinforcement 17 and armold ceiling 18 (refer to FIGS. 7 and 8) to be coupled to each other are matched to each other, from one surface side (from interior side, and from upper surface side in FIG. 7 and 8) of the above mold ceiling 18. Further, by inserting this pin member 6 into the above hollow portion 5 of this grommet 4, the elastic pieces 2 of the above grommet 4 are expanded on the other surface side (on exterior side, and on the lower surface side in FIGS. 7 and 8), and the ceiling reinforcement 17 and the mold ceiling 18 can be coupled to each other in a superimposed state on each other.

Figure 2A:
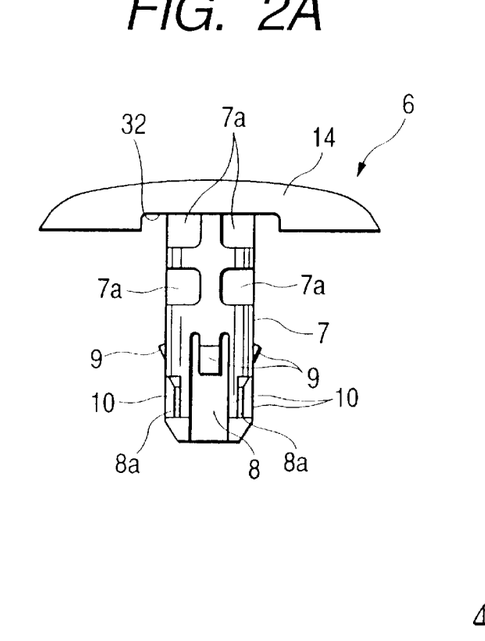
FIG. 2A is a front view.
Figure 2B:
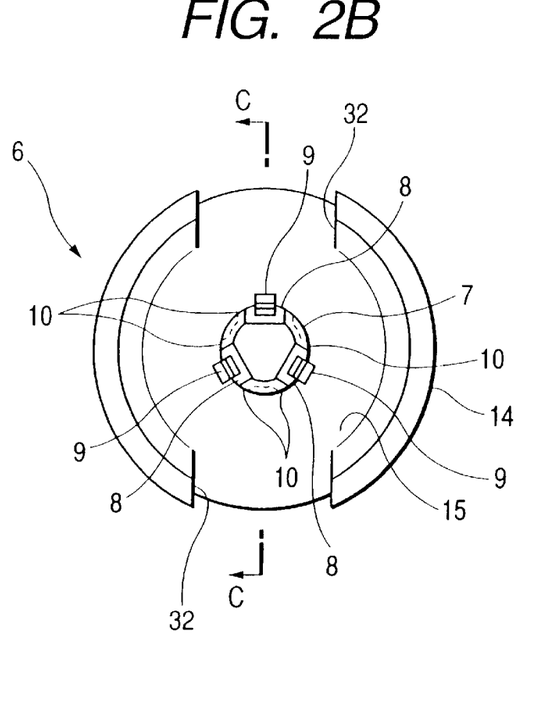
FIG. 2B is a bottom view.
Figure 2C:
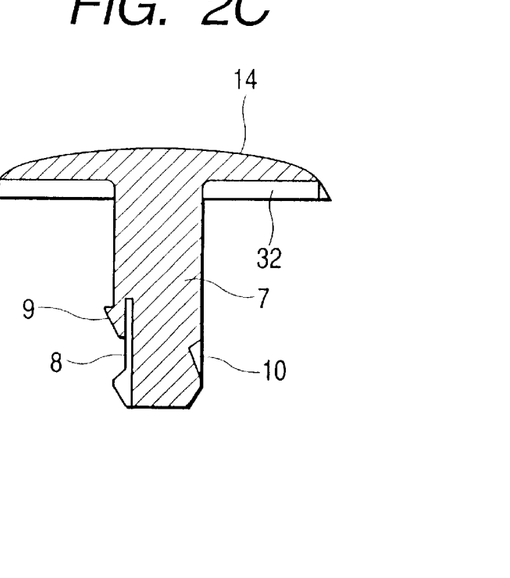
FIG. 2C is a diagram corresponding to a section taken along a line c—c in FIG. 2B.
Figure 3A:
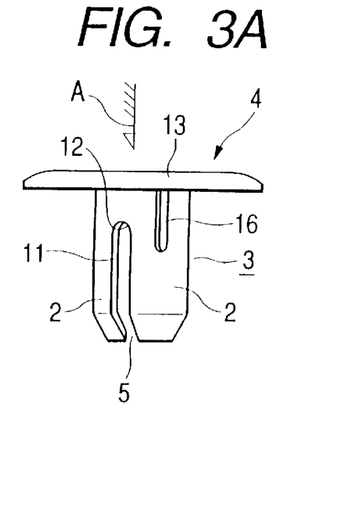
FIG. 3 is a front view.
Figure 3B:
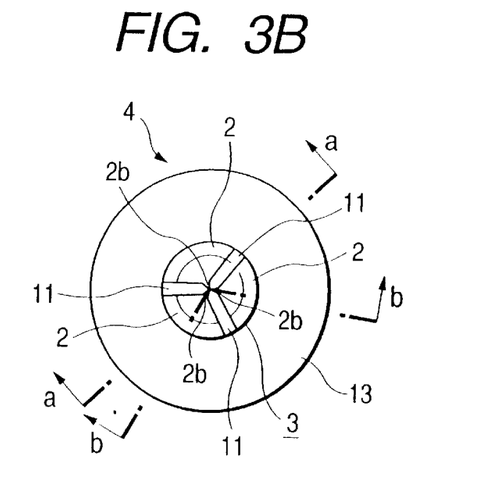
FIG. 3B is a plan view.
Figure 3C:
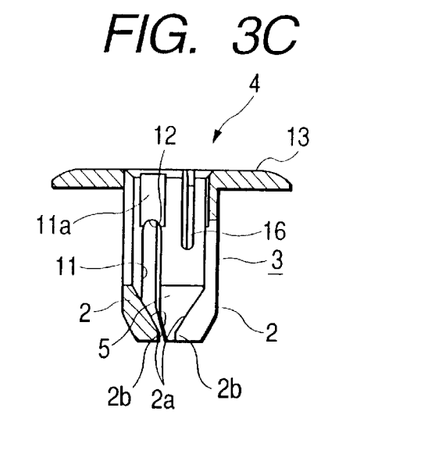
FIG. 3C is a sectional view taken along a line a—a in FIG. 3B.
Figure 3D:
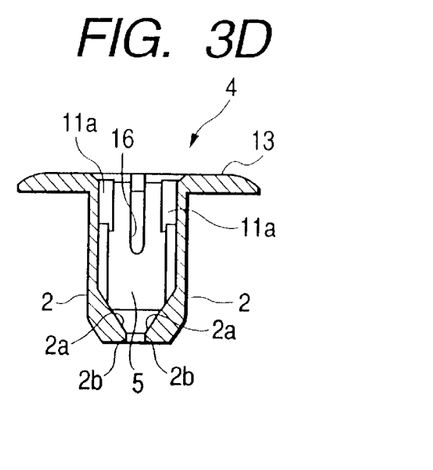
FIG. 3D is a sectional view taken along a line b—b in FIG. 3B.
Figure 3E:
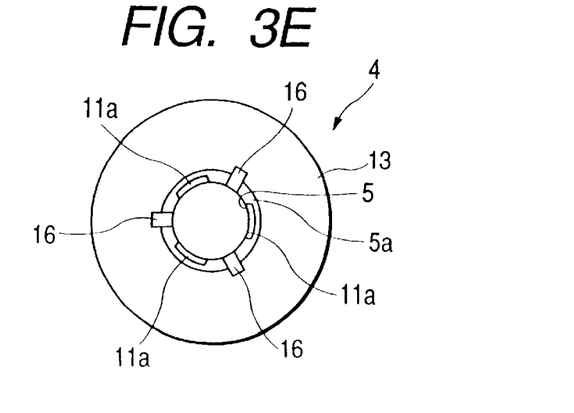

In the clip 1 according to the aforesaid embodiment, the above pin member 6 includes an axial portion 7 capable of being inserted into the above hollow portion 5; a plurality of recess grooves 8 (three grooves in the figures) formed at the leading half portion of this axial portion 7 (at the lower half portion in FIGS. 1 and 2A–2C) in the circumferential direction; temporarily stopping pieces 9 that are provided for base end portions (for the upper end portions in FIGS. 1 and 2A–2C) of these recess grooves 8 and protrude outward; and earth bank-like dams 10 formed at the leading half portion of the above recess grooves 8 which come into elastic contact with the above axial leg 3. The depth of each of these dams 10 is formed shallower than that of each of the above recess grooves 8. Further, at the base end portion of the above axial portion 7, thickness cut-portions 7a are formed as shown in FIGS. 1 and 2A to 2C. Further, in this embodiment, since the three elastic pieces 2 are formed in the above grommet 4, the transverse cross section of the leading end portion of the axial portion 7 is formed substantially triangularly as shown in FIG. 2A to 2C.

The above recess groove 8 is enlarged and shown in FIGS. 4A, 4B and 5A, 5B. It is formed on the rear surface side of the temporarily stopping piece 9 in a state where it is cut in the direction of the base end side of the axial portion 7. That is, on the surface side from the base end of each recess groove 8 to the middle portion thereof, the above temporarily stopping pieces are spaced and provided so as to cover the recess grooves 8. By this constitution, deflection is allowed to the above temporarily stopping pieces 9. Further, the above recess grooves 8 extend to the leading end of the axial portion 7. Accordingly, when this pin member 6 is manufactured, rapping becomes easy, so that time for manufacture and the manufacturing cost can be reduced. Further, the inclination θ2 of a pawl piece 9a formed at the leading end portion of the above temporarily stopping piece 9 is steeper than the inclination θ1 of a tapered portion 5a at the base end of the hollow portion 5 of the above grommet 4. This fact makes it easy to insert the axial portion 7 into the above hollow portion 5.

On the other hand, in the above grommet 4, a slit 11 between the adjacent elastic pieces 2 is interposed. And, a base end portion of this slit 11 serves as a fitting receiver 12 in which the above temporarily stopping piece 9 is fitted. Further, inner surfaces 2a of the leading end portions of the above elastic pieces 2 are formed so as to be tapered in the direction where they approach each other. Hereby, when the axial portion 7 of the above pin member 6 is inserted into the grommet 4, each of the elastic pieces 2 is gradually expanded. The aforesaid tapered inner surfaces 2a are, as shown in FIG. 1, formed in the cuspidate shape having the center portions in the width direction of the elastic pieces 2 as an apex (formed substantially in the shape of a triangle in a transverse section). Further, the outer surfaces of the leading end portions of the above elastic pieces 2 are also tapered so that the diameter of the axial leg gradually becomes smaller toward the leading end of the axial leg, as shown in FIGS. 1 and 3A to 3E. This makes it easy to insert the axial portion 7 into the hole 31 and the like provided for the mold ceiling 18 and the like. Further, recess portions 11a are provided on the inner surface of the axial leg 3 of the above grommet 4, which extend from the upper portion of the grommet 4 to the above slits 11.

The base end of the hollow portion 5 formed in the above grommet 4 is formed as a tapered portion 5a as described above. The above recess portion 11a is formed so as to continue to the tapered portion 5a on the way of the tapered portion 5a. By forming the recess portion 11a so as to continue to the tapered portion 5a on the way of the tapered portion 5a, when the axial portion 7 of the pin member 6 is inserted into the hollow portion 5 of the grommet 4, the leading end portion of the temporarily stopping piece 9 is guided firstly to the above tapered portion 5a. Then, while the leading end portion of the temporarily stopping piece 9 is being sequentially guided to the recess portion 11a, it inserted into the hollow portion 5. Therefore, the insertion of this axial portion 7 is smoothly performed.

Further, in case of the structure in this embodiment, a first flange 13 is provided for the base end of the axial leg 3 of the above grommet 4, and a second flange 14, of which the diameter is larger than that of the flange 13, is provided for the base end of the axial portion 7 of the above pin member 6. And, a surface on the axial portion 7 side of the above second flange portion 14 is formed as a recess surface 15 into which the above first flange 13 can be fitted. Namely, the base area of the above recess surface 15 is larger a little than that of the above first flange 13, and the depth of the former 15 is the same as or larger than the height of the latter 13. Further, apertures 16 that extend in the longitudinal direction (vertical direction in FIG. 1) are formed in the above elastic pieces 2.

Figure 4A:
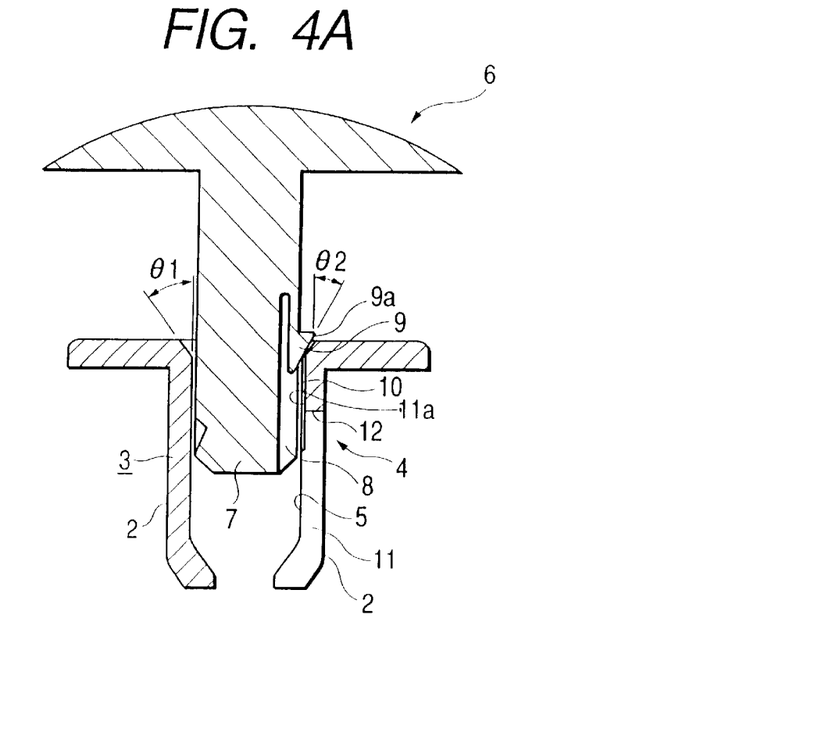
FIG. 4A is a vertical sectional side view showing a state when the insertion is started.
Figure 4B:
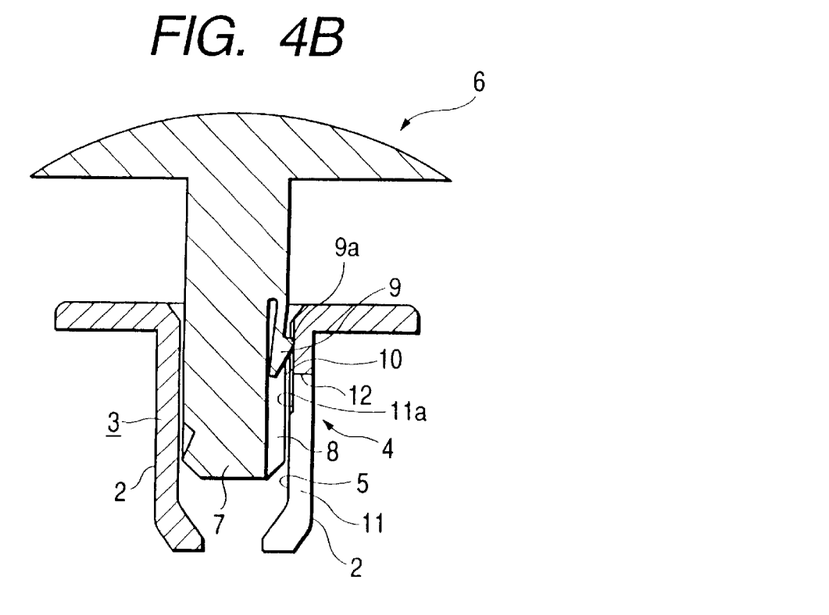
FIG. 4B is a vertical sectional side view showing a state on the way of the insertion.
Figure 5A:
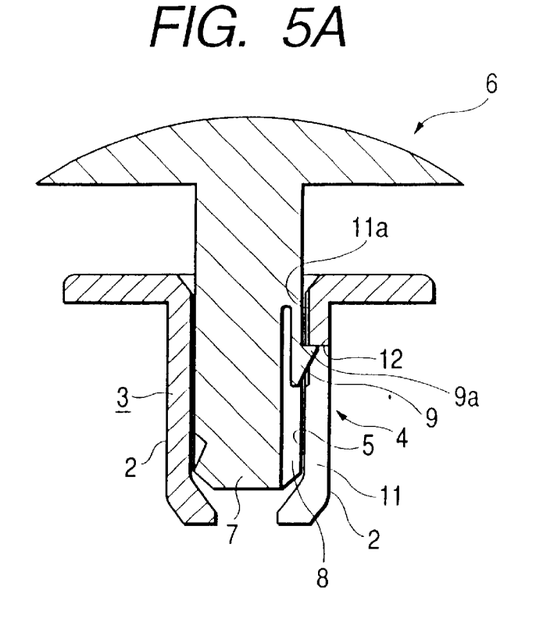
FIG. 5A is a vertical sectional side view showing a state where an axial portion has been further inserted from the temporarily fixing state.

In the thus constructed clip 1 according to this embodiment, in case that the pin member 6 is inserted into the grommet 4 in order to temporarily fix the ceiling reinforcement 17 and the mold ceiling 18 to each other, as shown in FIG. 4A, firstly, the temporarily fixing pieces 9 provided for the axial portion 7 of the pin member 6 are guided to the tapered portion 5a of the hollow portion 5, so that the axial portion 7 is in a state where it is readily inserted into the hollow portion 5. Then, as shown in FIG. 4B, the above temporarily stopping pieces 9 are deflected by the pressing force from the above hollow portion 5 in a direction where the pieces 9 contract, so that the axial portion 7 is inserted into the hollow portion 5. At this time, while the temporarily stopping pieces 9 are being guided in the recess portions 11a, 11a provided for the above grommet 4, the axial portion 7 is inserted into the hollow portion 5. When the axial portion 7 is inserted till the above temporarily stopping pieces 9 get over the recess portions 11a as shown in FIG. 5A, the temporarily stopping pieces 9 are restored, and the pawl pieces 9a are fitted in the fitting receivers 12 of the base ends of the recess portions 11a, so that the axial portion is prevented from moving in the direction opposite to the insertion direction. This state is a temporarily fixing state. In this temporarily fixing state, the pawl pieces 9a fit in the base ends of the recess portions 11a to prevent the axial portion from moving in the direction opposite to the insertion direction. Therefore the pin member 6 is effectively prevented from dropping out of the grommet 4.

Figure 5B:
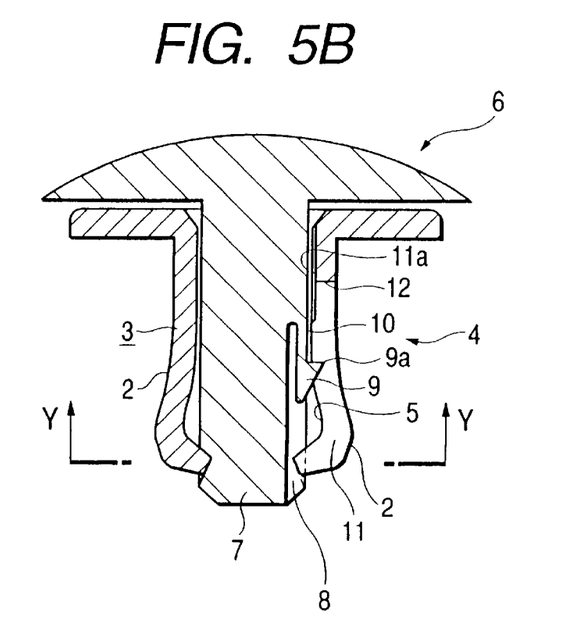
FIG. 5B is a vertical sectional side view showing a state where the pin member has been completely inserted.
Figure 6:
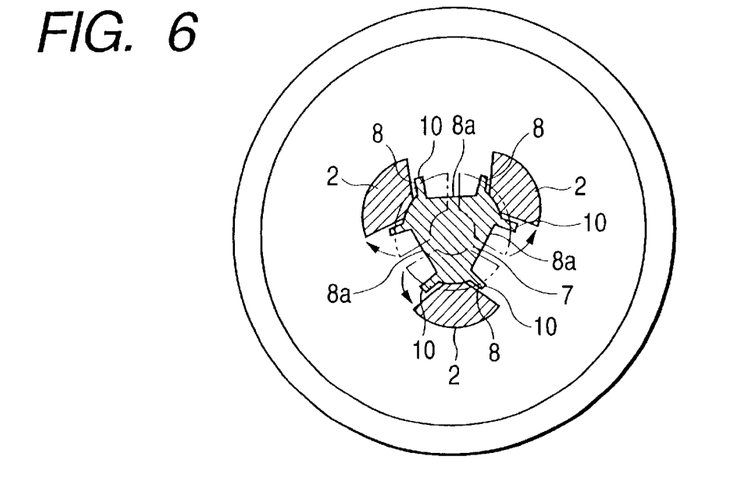
FIG. 6 is a diagram corresponding to a section taken along a line Y—Y in FIG. 5B, showing a state at the real fixing time.

Further, in case that the pin member 6 is really fixed in the grommet 4, the axial portion 7 is further inserted into the inner part of the hollow portion 5 from the above temporarily fixing state. At this time, while the elastic pieces 2 of the grommet 4 are being expanded by the pressing force of the axial portion 7, this axial portion 7 is inserted. When the axial portion 7 is completely inserted, the above elastic pieces 2 are restored, and the leading end edges of these elastic pieces 2 are fitted in grooves 8a of which each is formed between the adjacent dams 10 as shown in FIGS. 5B and 6. As a result, the pin member 6 is prevented from coming out in the direction opposite to the insertion direction, that is, it is prevented that the real fixing state is released.

Since the axial portion 7 of the above pin member 6 is inserted into the hollow portion 5 of the grommet 4 as described above, the work of inserting the pin member 6 into the grommet 4 is simplified. Further, the pin member 6 is effectively prevented from dropping out of the grommet 4 in either state of the temporarily fixing state and the real fixing state. Namely, in the temporarily fixing state, the temporarily stopping pieces 9 fit in the fitting receivers 12 of the base ends of the slits 11; and in the real fixing state, the leading end edges of the elastic pieces 2 fit in the grooves 8a, 8a. Therefore, the pin member 6 is prevented from moving in the direction where the pin member 6 separates from the grommet 4 (direction of an arrow α in FIG. 7).

In the real fixing state, the elastic pieces 2 provided for grommet 4 is effectively prevented from shifting and rotating due to the existence of the above earth bank-like dams 10, 10. Namely, even in case that these elastic pieces 2 tend to shift, they are obstructed by the above dams 10 and prevented from shifting. It is effective to prevent the grommet 4 from shifting by these dams 10 in a case where some scatter is produced in diameter and shape of each attaching hole formed in the panels (the above ceiling reinforcement 17, the mold ceiling 18, and the like) due to inevitable manufacturing error. Namely, in case that there is the above scatter, the elastic pieces 2 provided for the grommet 4 are readily deflected, so that there is fear that the sufficient and stable fitting power cannot be obtained. On the other hand, in case of this embodiment, since the above shift is prevented, the stable fitting power can be obtained. Further, such an effect that the above pin member 6 is hard to rotate in relation to the grommet due to these dams 10 can also expected. As a result, the shift of the grommet 4 and the rotation of the pin member 6 are prevented, so that the stable fixing state can be maintained also after the real fixing work.

Further, in case of the structure in this embodiment, the surface on the axial portion 7 side of the above second flange portion 14 is formed as the recess surface 15 into which the above first flange 13 can be fitted. Therefore, at the real fixing time, the first flange 13 is fitted in the recess portion 15 on the inner surface of the second flange 14. As a result, the projecting amount of the above second flange 14 from the mold ceiling 18 is reduced and a look becomes better. Further, the user is prevented from hitching his finger on the projecting flange 14 and being injured by contact of a part of his body with the flange 14, so that safety is improved. Further, since the apertures 16 that extend in the longitudinal direction are formed in the above elastic pieces 2 these elastic pieces 2 are easy to deflect. Accordingly, the pin member 6 is readily inserted into the grommet 4.

Further, in case of this embodiment, recess grooves 32, into which a leading end portion of a minus (−) driver can be inserted are formed in two positions of the outer edge portions of the second flange 14. Accordingly, in case that the really fixed mold ceiling 18 is replaced, when the leading end portion of the minus driver is inserted into these recess grooves 32 and the second flange 14 is operated in a direction where it separates from the first flange 13, the clip can be readily detached from the above mold ceiling 18. Namely, by the operation of the above minus driver, the pin member 6 having the second flange 14 is first extracted from the grommet 4 in some degree (till the temporarily stopping pieces 9 of the above pin member 6 are fitted in the fitting receivers 12 of the grommet 4). Thereafter, while this temporarily fixing state is being maintained, the pin member 6 and the grommet 4 are integrally detached from the mold ceiling 18. Therefore, maintenance of the interior of the automobile can be readily performed.

In the aforesaid example, the invention is applied to a case where the ceiling reinforcement 17 and the mold ceiling 18 that constitute the ceiling part of the automobile are previously fixed temporarily and then they are coupled to the front head panel of the automobile. The clip according to the invention is not limited to the aforesaid example. That is, the invention can be utilized in any cases as long as the clip according to the invention is used in order to couple the plural panels to one another.

In the clip according to the first aspect of the invention, the pin member is readily inserted into the grommet. Further, in the temporarily fixing state after the pin member has been completely inserted, the pin member is effectively prevented from dropping out of the grommet. Accordingly, the temporarily fixing work is readily performed using this clip.

And, even in case that the temporarily fixed panels are transported, it is prevented that the pin member drops out during transportation, that the temporarily fixing state cannot be maintained and that fitting of a pair of panels is undone. Further, it is prevented that the trouble caused by dropping-out of the pin member is produced in the assembling process, so that the real fixing work is smoothly performed. Further, in either of the temporarily fixing and the real fixing, the pin member can be inserted into the grommet readily and smoothly, so that the work performance is improved.

In the clip according to the second aspect of the invention, in case that the pin member is inserted into the grommet in the real fixing state, the elastic piece provided for the grommet is effectively prevented from shifting by the existence of the above dam. Further, such an effect can be also expected that the above pin member is difficult to rotate in relation to the grommet due to the existence of this dam. Therefore, the grommet and the pin are prevented from shifting and moving, and the stable fixing state can be maintained also after the real fixing.

In the clip according to the third aspect of the invention, the projecting amount of the flange from the wall surface of the panel is reduced and a look is better. Further, the user is prevented from hitching his finger on the projecting flange and being injured, so that safety is improved.

In the clip according to the fourth aspect of the invention, the insertion of the axial portion into the above hollow portion is more readily performed, so that the work performance is improved.

In the clip according to the fifth aspect of the invention, the above temporarily stopping piece is more readily guided to the above recess portion, so that the work performance is improved.

What is claimed is:

1. A clip comprising:

a grommet having an axial leg formed in the shape of a hollow cylinder by a plurality of elastic pieces; and a pin member for being inserted into a hollow portion formed in said axial leg, said pin member expanding said plurality of elastic pieces upon insertion into said hollow portion;

wherein said pin member includes an axial portion that is insertable into said hollow portion, and a temporarily stopping piece protruding outward from said axial portion; and wherein said grommet includes a recess portion for guiding said temporarily stopping piece, said recess portion formed on the inner surface of said axial leg so as to extend from a top portion of said grommet to a slit formed between adjacent elastic pieces, and wherein a base end portion of said slit serves as a fitting receiver in which said temporarily stopping piece is fitted.

2. The clip according to claim 1, wherein said pin member includes a dam formed at a portion with which said axial leg comes into elastic contact at a real fixing time.

3. The clip according to claim 2, wherein said pin member comprises a plurality of recess grooves formed on said axial portion adjacent said dam.

4. The clip according to claim 3, wherein said dam has a shallower depth in a radial direction than a depth of said recess grooves.

5. The clip according to claim 1, wherein a first flange is formed at a base end of the axial leg of said grommet and a second flange having a diameter larger than a diameter of said first flange is formed at a base end of the axial portion of said pin member and a surface on an axial portion side of said second flange comprises a recess surface into which said first flange can be fitted.

6. The clip according to claim 1, wherein a tapered portion is provided for a base end of the hollow portion of said grommet, and an inclination of a leading end portion of said temporarily stopping piece is steeper than an inclination of said tapered portion.

7. The clip according to claim 6, wherein said recess portion continues from a middle of said tapered portion.

8. The clip according to claim 1, wherein said axial portion at a leading end portion comprises a substantially triangular transverse cross section.

9. The clip according to claim 1, wherein outer surfaces of the leading end portions of the elastic pieces are tapered so that the diameter of the axial leg gradually becomes smaller towards a leading end of said axial leg.

10. The clip according to claim 1, wherein said recess portion and said slit delimit said adjacent elastic pieces.

11. The clip according to claim 1, wherein said top portion of said grommet around said hollow portion formed in said axial leg comprises a tapered portion.

12. The clip according to claim 11, wherein said recess portion is connected to said tapered portion such that, when said pin member is inserted into said grommet, a leading end portion of said temporarily stopping piece first contacts said tapered portion and then is guided along said recess portion.

* * * * *